United States Patent
Laselva et al.

(10) Patent No.: US 11,019,583 B2
(45) Date of Patent: May 25, 2021

(54) METHOD FOR NETWORK-ASSISTED UPLINK TIME ADVANCE FOR EXTREME RANGE SUPPORT

(71) Applicant: Nokia Technologies Oy, Espoo (FI)

(72) Inventors: Daniela Laselva, Klarup (DK); Frank Frederiksen, Klarup (DK); István Kovács, Aalborg (DK); Jeroen Wigard, Klarup (DK)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/389,800

(22) Filed: Apr. 19, 2019

(65) Prior Publication Data

US 2019/0342845 A1 Nov. 7, 2019

Related U.S. Application Data

(60) Provisional application No. 62/667,044, filed on May 4, 2018.

(51) Int. Cl.
| | |
|---|---|
| *H04W 56/00* | (2009.01) |
| *H04L 1/18* | (2006.01) |
| *H04W 72/04* | (2009.01) |

(52) U.S. Cl.
CPC ....... *H04W 56/0005* (2013.01); *H04L 1/1812* (2013.01); *H04W 72/0413* (2013.01); *H04W 72/0446* (2013.01)

(58) Field of Classification Search
CPC ................................................. H04W 56/0005
See application file for complete search history.

(56) References Cited

U.S. PATENT DOCUMENTS

| | | | |
|---|---|---|---|
| 2015/0334707 A1* | 11/2015 | Rajagopalan ...... | H04B 7/18506 370/280 |
| 2016/0057784 A1* | 2/2016 | You ...................... | H04W 88/04 370/329 |

(Continued)

OTHER PUBLICATIONS

"3rd Generation Partnership Project; Technical Specification Group Radio Access Network; Evolved Universal Terrestrial Radio Access (E-UTRA); Physical channels and modulation (Release 15)", 3GPP TS 36.211 V15.0.0, Dec. 2017, pp. 1-219.

(Continued)

*Primary Examiner* — Edan Orgad
*Assistant Examiner* — Won Tae C Kim
(74) *Attorney, Agent, or Firm* — Harrington & Smith

(57) ABSTRACT

A method includes receiving, from a base station, network signaling including information about one or more of a timing advance scaling parameter, a processing-delay compensation parameter, and a timing advance extension parameters enabling threshold/condition; receiving a timing advance index from the base station; adjusting parameters for uplink transmissions using the received timing advance index for the one or more of the timing advance scaling parameter, the processing-delay compensation parameter, and the timing advance extension parameters enabling threshold/condition; and performing uplink transmissions according to the configured and adjusted parameters. Another method includes sending, to a user equipment, network signaling including information about one or more of a timing advance scaling parameter, a processing-delay compensation parameter, and a timing advance extension parameters enabling threshold/condition; sending a timing advance index to the user equipment; and receiving uplink transmissions according to the configured and adjusted parameters.

20 Claims, 5 Drawing Sheets

(56) References Cited

U.S. PATENT DOCUMENTS

2016/0323070 A1* 11/2016 Chen ................. H04L 1/1887
2017/0201958 A1* 7/2017 He .................... H04W 72/0413
2020/0221508 A1* 7/2020 Huang ............... H04W 74/006

OTHER PUBLICATIONS

"3rd Generation Partnership Project;Technical Specification Group Radio Access Network; NR; Physical channels and modulation (Release 15)", 3GPP TS 38.211 V15.0.0, Dec. 2017, pp. 1-73.

"3rd Generation Partnership Project; Technical Specification Group Radio Access Network; Study on New Radio (NR) to support non terrestrial networks (Release 15)", 3GPP TR 38.811 V03.0, Dec. 2017 pp. 1-56.

* cited by examiner

METHOD FOR NETWORK-ASSISTED UPLINK TIME ADVANCE FOR EXTREME RANGE SUPPORT

TECHNICAL FIELD

The present disclosure relates to uplink timing synchronization and to timing advances for scenarios in which cell size or range is as large as one thousand kilometers.

BACKGROUND

An initial access procedure, including random access channel (RACH) preamble detection and timing advance (TA) estimation procedures, is performed to support multi-UE uplink transmission, and specifically to maintain orthogonality among user equipment (UEs), in cellular systems, such as long-term evolution (LTE) and new radio (NR). The physical random access channel (PRACH) format determines the maximum cell size or radius. The currently used PRACH format allows for a maximum cell radius of approximately 100 kilometers. For larger cell sizes or radii, it is necessary to adjust the required timing advance upward.

Clearly, a standardized method to support larger cell radii based on modified signaling of TA information may prove to be very helpful.

SUMMARY

In a first aspect of the present disclosure, a method comprises: receiving, from a base station, network signaling including information about one or more of a timing advance scaling parameter, a processing-delay compensation parameter, and a timing advance extension parameters enabling threshold/condition; receiving a timing advance index from the base station; adjusting parameters for uplink transmissions using the received timing advance index for the one or more of the timing advance scaling parameter, the processing-delay compensation parameter, and the timing advance extension parameters enabling threshold/condition; and performing uplink transmissions according to the configured and adjusted parameters.

In a second aspect of the present disclosure, an apparatus comprises: at least one processor; and at least one memory including computer-program code, the at least one memory and the computer-program code configured, with the at least one processor, to cause the apparatus to perform: receiving, from a base station, network signaling including information about one or more of a timing advance scaling parameter, a processing-delay compensation parameter, and a timing advance extension parameters enabling threshold/condition; receiving a timing advance index from the base station; adjusting parameters for uplink transmissions using the received timing advance index for the one or more of the timing advance scaling parameter, the processing-delay compensation parameter, and the timing advance extension parameters enabling threshold/condition; and performing uplink transmissions according to the configured and adjusted parameters.

In a third aspect of the present disclosure, an apparatus comprises: means for receiving, from a base station, network signaling including information about one or more of a timing advance scaling parameter, a processing-delay compensation parameter, and a timing advance extension parameters enabling threshold/condition; means for receiving a timing advance index from the base station; means for adjusting parameters for uplink transmissions using the received timing advance index for the one or more of the timing advance scaling parameter, the processing-delay compensation parameter, and the timing advance extension parameters enabling threshold/condition; and means for performing uplink transmissions according to the configured and adjusted parameters.

In a fourth aspect of the present disclosure, a computer program product comprises a computer-readable storage medium bearing computer program code embodied therein for use with a computer, the computer program code comprising code for performing: receiving, from a base station, network signaling including information about one or more of a timing advance scaling parameter, a processing-delay compensation parameter, and a timing advance extension parameters enabling threshold/condition; receiving a timing advance index from the base station; adjusting parameters for uplink transmissions using the received timing advance index for the one or more of the timing advance scaling parameter, the processing-delay compensation parameter, and the timing advance extension parameters enabling threshold/condition; and performing uplink transmissions according to the configured and adjusted parameters.

In a fifth aspect of the present disclosure, a method comprises: sending, to a user equipment, network signaling including information about one or more of a timing advance scaling parameter, a processing-delay compensation parameter, and a timing advance extension parameters enabling threshold/condition; sending a timing advance index to the user equipment; and receiving uplink transmissions according to the configured and adjusted parameters.

In a sixth aspect of the present disclosure, an apparatus comprises: at least one processor; and at least one memory including computer-program code, the at least one memory and the computer-program code configured, with the at least one processor, to cause the apparatus to perform: sending, to a user equipment, network signaling including information about one or more of a timing advance scaling parameter, a processing-delay compensation parameter, and a timing advance extension parameters enabling threshold/condition; sending a timing advance index to the user equipment; and receiving uplink transmissions according to the configured and adjusted parameters.

In a seventh aspect of the present disclosure, an apparatus comprises: means for sending, to a user equipment, network signaling including information about one or more of a timing advance scaling parameter, a processing-delay compensation parameter, and a timing advance extension parameters enabling threshold/condition; means for sending a timing advance index to the user equipment; and means for receiving uplink transmissions according to the configured and adjusted parameters.

In an eighth aspect of the present invention, a computer program product comprises a computer-readable storage medium bearing computer program code embodied therein for use with a computer, the computer program code comprising code for performing: sending, to a user equipment, network signaling including information about one or more of a timing advance scaling parameter, a processing-delay compensation parameter, and a timing advance extension parameters enabling threshold/condition; sending a timing advance index to the user equipment; and receiving uplink transmissions according to the configured and adjusted parameters.

BRIEF DESCRIPTION OF THE DRAWINGS

The foregoing and other aspects of these teachings are made more evident in the following detailed description, when read in conjunction with the attached drawing figures.

DETAILED DESCRIPTION

Figure 1:
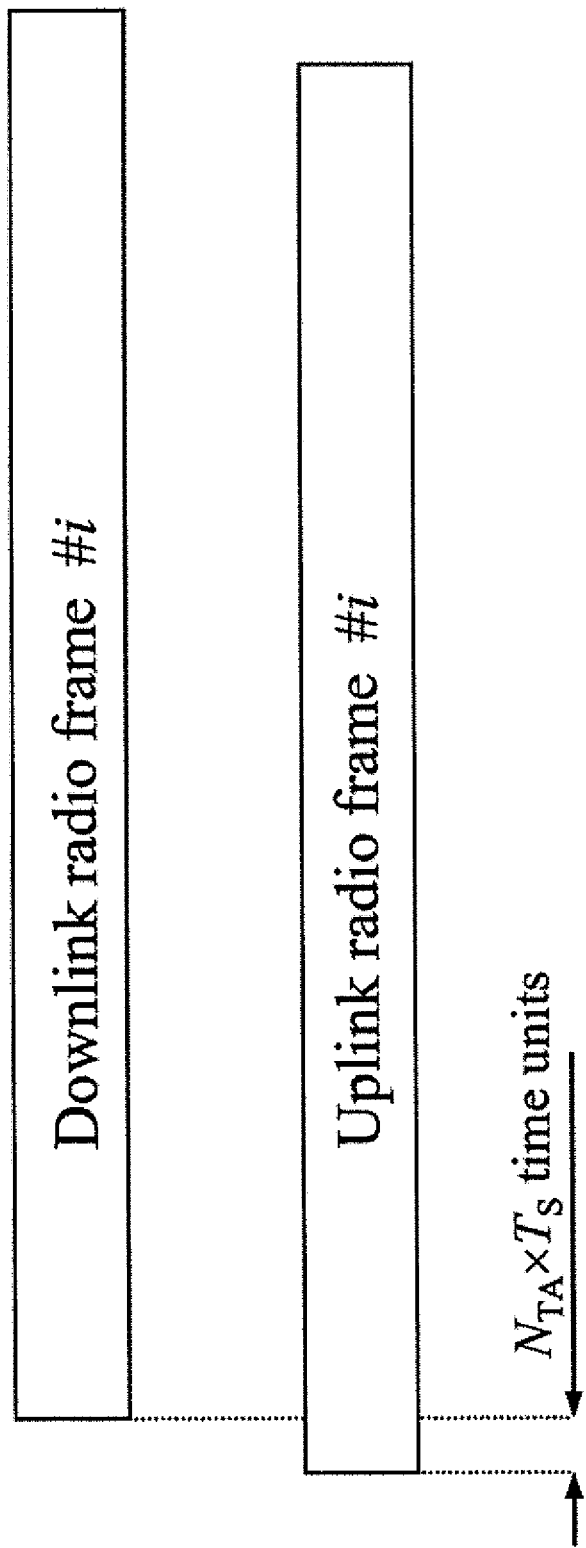
FIG. 1 illustrates a timing diagram for the uplink.

An initial access procedure, including random access preamble detection and timing advance (TA) estimation procedures, is performed to support multi-UE uplink transmission, and specifically to maintain orthogonality among a plurality of user equipment (UEs), in cellular systems, such as long-term evolution (LTE) and new radio (NR).

In short, in LTE/NR, as set forth in 3GPP TS 36.211 and 3GPP TS 38.211, respectively, the initial access procedure is performed as follows.

First, in the random access response (RAR) message, the base station, eNB for LTE or gNB for NR, indicates the successfully received preamble(s), along with the timing advance (TA) information and the uplink resource allocation information, which the UE should use for transmission.

Subsequently, the UE uses the TA information to adjust its uplink (UL) timing. This means that the UE can send UL data only after acquiring the UL timing synchronization, and that the UE does so based on the network indication.

The network also provides, via the broadcast channel, several other system information elements, which allow the UE to perform the random access, such as physical random access channel (PRACH) resources, timing, and so forth.

As will be shown below, the PRACH preamble format will determine the maximum cell size which can be achieved. The following table summarizes the available formats for LTE.

TABLE 1

Supported cell radius corresponding to LTE Preamble Formats 0 to 4

| Preamble Format | $T_{CP}$ (ms) | $T_{SEQ}$ (ms) | Total Duration (ms) | Number of Subframes for PRACH | Guard Time (ms) | Cell Radius (km) |
|---|---|---|---|---|---|---|
| 0 | 0.103 | 0.800 | 0.903 | 1 | 0.097 | ~14 |
| 1 | 0.684 | 0.800 | 1.484 | 2 | 0.516 | ~75 |
| 2 | 0.203 | 1.600 | 1.803 | 2 | 0.197 | ~28 |
| 3 | 0.684 | 1.600 | 2.284 | 3 | 0.716 | ~108 |
| 4 | 0.015 | 0.133 | 0.148 | <1 | 0.009 | ~1.4 |

In Table 1, $T_{CP}$ and $T_{SEQ}$, cyclic prefix duration and sequence duration, respectively, are expressed in units of milliseconds.

In NR PRACH design according to 3GPP TS 38.211, there is also currently a limitation on the maximum cell range to less than 100 km.

The following calculations are preformed to determine the cell radius (maximum cell range) for each specified preamble format. As an example, for LTE:

Cell radius = distance = (signal speed) × (signal traveling time) =

$$c \cdot RTT/2 = c \cdot GT/2 \text{ where } c = 3 \times 10^8 \text{ m/s}.$$

It will be recognized, then, that the guard time is equal to the round-trip time between a base station, eNB or gNB, and a user equipment for a signal traveling at the speed of light, c. The cell radius is then one half of the distance traveled by a signal during the round-trip time or guard time.

GT=Guard time=T (duration of PRACH)−$T_{CP}$−$T_{SEQ}$, where the duration of PRACH is 1, 2, or 3 ms, when the PRACH takes up 1, 2, or 3 subframes, respectively.

$T_{SEQ}$=sequence duration. A longer sequence gives better coverage performance in noise-limited scenarios. However, better coverage requires a longer CP, to resolve a larger time dispersion/delay spread, and longer GT, in order to absorb the corresponding round-trip delay. For example, $T_{SEQ} \geq 200 \times 10^3$ m/$3 \times 10^8$ m/s+16.67·$10^{-6}$ sec=683.33 µs=> for unambiguous RTT estimation for a UE at the cell edge including a maximum delay spread of 16.67 µs, which is accommodated by the extended CP length. $200 \times 10^3$ m/$3 \times 10^8$ m/s represents the time a signal takes to make a "round trip" between two nodes at a distance of 100 km, which is 200 km traveled in total.

$T_{CP}$=cyclic prefix duration. A longer value adds tolerance towards fading, and reducing inter-symbol interference (ISI). The residual delay spread at the end of the preamble from a cell-edge UE spills over into the next subframe, which is accommodated by the CP at the start of the next subframe to avoid any ISI.

The uplink timing advance (TA) is exemplified in FIG. 1 with the main signaling steps summarized in Table 2 below. During step i, the UE sends a random access preamble to the base station (eNB or gNB). Since the UE does not have a known absolute time reference, it will have to rely on the observed timing based on the received signals. Hence, the UE reference timing will offset according to the base station's understanding of time with a value that corresponds to the propagation delay between the base station and the UE. Upon receiving the random access preamble from the UE, the base station can calculate the total round trip time of the signals between the base station and the UE. During step ii, the base station indicates the amount of time offset the UE should apply when transmitting subsequently along with a grant for the uplink transmission. When doing the transmission in step iii, the UE will transmit with a time offset corresponding to $N_{TA} \times T_S$ time units, where $T_S$ is the basic time unit in LTE, and is defined to be 1/(15000×2048) seconds; this represents the sampling time for one OFDM (orthogonal frequency division multiplexing) symbol with 2048 points IFFT (Inverse Fast Fourier Transform). $T_S$ is equal to a little more than 32 nanoseconds. In case of multiple UEs doing random access preamble transmission in step i, there is a probability of a contention if more than one UE selects the same preamble for transmission. During step iv, the base station has the possibility to resolve the contention collision.

TABLE 2

RACH procedure including Timing Advance signaling to the UE

| "Contention-Based" RACH Procedure | "Contention-Free" RACH Procedure |
|---|---|
| Step i) UE → NW: RACH Preamble (RA-RNTI, indication for L2/L3 message size) | Step i) NW → UE: RACH Preamble (PRACH) Assignment |
| Step ii) NW → UE: Random Access Response (Timing Advance(*), T_C-RNTI, UL grant for L2/L3 message) | Step ii) UE → NW: RACH Preamble (RA-RNTI, indication for L2/L3 message size) |
| Step iii) UE → NW: L2/L3 message | Step iii) NW → UE: Random Access Response (Timing Advance(*), C-RNTI, UL grant for L2/L3 message) |
| Step iv) Message for early contention resolution | |

(*)Timing Advance in LTE can be set up with a granularity of 0.52 µs, from 0 to 0.67 ms which corresponds to a cell radius of 100 km.

With this as background, the present disclosure is directed toward UL timing synchronization and extends time advance for LTE and NR in scenarios of extreme long cell range, in which the cell range is on the order of a few hundred to a thousand kilometers.

As noted above, the PRACH preamble format will determine the maximum cell size/radius. For example, referring to Table 1 above, for Preamble Format "0", which includes one subframe of duration 1.0 ms, the combined duration of the cyclic prefix and the sequence, that is, the random access preamble sequence, is 0.903 ms, leaving a guard time at the end of the 1.0 ms of 0.097 MS.

Let us assume that a UE is located at the center of a cell and another UE is located at the edge of the cell, and that the UEs are not uplink synchronized and are about to perform a random access. The RACH configuration information is sent by the eNB to both of the UEs. The UEs each receive the RACH configuration information and sent RACH preambles to the eNB in the same subframe. The RACH preamble from the UE at the edge of the cell arrives at the eNB later than that of the UE at the center of the cell by an amount equal to the guard time. Thus, the guard time is equal to the round-trip delay between the eNB and the cell edge.

Returning to the guard time of 0.097 ms, the cell radius is approximately $3 \times 10^8$ msec·0.097 ms/2=14.55 km. The value given in Table 1 is given to be ~14 km because processing time in the UEs has not been taken into account.

According to the defined formats, LTE allows for a maximum cell radius of approximately 100 km, that is, maximum one-way propagation delays up to approximately 100 km. For that, the cyclic prefix (CP) is dimensioned to account for a maximum delay spread of d≈16.67 µs and $T_{SEQ}$ assumes the longest sequence of 800 µs which is repeated twice for a total time of 1600 µs.

Currently in LTE, the timing advance can be set up, with a granularity or resolution of 0.52 µs, from 0 to 0.67 ms which corresponds to a cell radius of 100 km.

Assuming a propagation speed of $3 \times 10^8$ m/s, the timing advance value for various extreme cell radii which would be required to realize this method are given below:

TA for cell radius of 150 km (signal can travel up to 300 km, which would be required, for example, in a long-range terrestrial network or a non-terrestrial network using high-altitude platforms) would be 1.0 ms.

TA for cell radius of 500 km (signal can travel up to 1000 km, which would be required, for example, in a non-terrestrial network using low-orbit satellites) would be 3.4 ms.

TA for cell radius of 1000 km (signal can travel up to 2000 km, which would be required, for example, in a non-terrestrial network using high medium-orbit satellites) would be 6.7 ms.

Support of a cell radius larger than 100 km has previously been left to implementation, for example, by allowing and compensating for non-synchronous UL transmissions.

The present disclosure proposes a standardized method to support larger cell radii by relying on modified signaling of the timing advance (TA) information.

Specifically, the present disclosure proposes a method of timing advance signaling and corresponding UE uplink synchronization to support extreme cell ranges in a cellular system, such as NR and LTE, beyond the current limitation of around 100 km:

1. The eNBs or gNBs, which are configured to provide extreme coverage beyond 100 km, such as connectivity for ship-to-shore communications, or eNBs or gNBs on satellite platforms, include, for example, in the broadcasted SIBs, additional information about one or more of the following: a) a TA offset parameter; b) a TA scaling parameter; c) a processing-delay compensation parameter; and d) a TA extension parameters enabling threshold/condition.

a. TA offset parameter: this parameter is meant to be used as an initial (low resolution) TA adjustment for use in the RACH preamble transmission, as well as for subsequent uplink transmissions.

i. The TA offset parameter assumes that all UEs connected to the eNB or gNB are located at more than a minimum distance corresponding to the TA offset. This would be, for instance, applicable in case the base station is placed on a high-altitude platform, such as a drone or a satellite. For such cases, there is a well-defined minimum physical distance between UE and base station.

b. TA scaling parameter: this parameter indicates a multiplicative scaling factor to be applied to all or to a subset of the TA values which can be normally signaled by the eNB or gNB in the RAR message. For example, considering the original TA time resolution of 0.52 µs, when using a scaling factor, the resolution could be set to an integer, such as 2, 4, 8, or 16, which would result in the following scaling of TA: 2, 4, 8, or 16×0.52 µs=1, 2, 4, or 8 µs (values rounded down), respectively. This would allow for a maximum TA of 2, 4, 8, or 16×0.67 ms, equivalent to a cell of a radius of 200, 400, 800, or 1600 km, respectively. More generally, for example, the scaling factor may take values from a set including the integers 1, 2, 4, 8, and 16, but such a set is not limited to these values.

c. Processing-delay compensation parameter: as setting the TA offset and TA scaling would allow for significant increase in applied TA values (in seconds), the time budget for UE processing would be correspondingly reduced. Hence, the processing-delay compensation parameter would be applied to relax the timing-related delays, such as HARQ-ACK feedback timing requirements.

d. TA extension parameters enabling threshold/condition: based on UE-estimated parameters and base-station-provided parameters, the UE may or may not apply the above TA extension parameters (that is, the TA offset parameter, the TA scaling parameter, and the processing-delay compensation parameter) and/or values.

i. The TA extension parameters enabling threshold/condition could be based on UE-received power levels, which would be indicative of a distance between base station and UE.

ii. Another example would be to use the PCI information as a "condition" assuming that the UE has knowledge of the PCI locations, such as whether they are of normal range (usual terrestrial access) or extreme range (satellite or ship-to-shore access).

2. The UE acquires cell synchronization (PSS, SSS) and decodes the available SIBs broadcasted by the eNB or gNB, and gains knowledge of the TA offset parameter, the TA scaling parameter, and the processing-delay compensation parameter values—one or more of which could be used in the given deployment and therefore be available in an SIB.

3. The UE performs the first step of the random access procedure and transmits a preamble sequence by taking into consideration the TA offset parameter, in order to compensate for most of the propagation delay expected at extreme range.

4. The eNB or gNB replies with a random access response (RAR) including the regular range of TA indices; however, in this case, each TA value to be further applied by the UE corresponds to the scaled TA values based on the TA scaling parameter value in addition to the TA offset value.

5. The UE adjusts its UL TA for subsequent uplink transmissions according to the received TA index and the new standardized TA scaling and shifting procedure.

6. The UE adjusts its operation with respect to HARQ-ACK timing reporting procedures to match the processing-delay compensation parameter, meaning that, instead of using, for example, n+4 for a HARQ-ACK processing delay, the UE would use n+4+x, where "x" is the additional signaled time for UE processing, as extending the TA value would correspondingly reduce the available UE processing time. With the additional "x" ms of processing, the UE would still have available processing budget to accommodate the additional TA values possible. Of course, "n" is the index of the timeslot (TTI) in which the UE has transmitted data; n+4 is the TTI index where the UE is expected to send the first HARQ retransmission, when it is needed.

It should be noted that the proposed TA parameters might be implemented as part of existing SIB signaling or as part of a new and optional SIB type.

The mechanism described above does require standardized signaling and use of the TA scaling, TA offset and processing-delay compensation parameters. The extra information TA scaling and TA offset can be signaled via broadcast SIBs and/or dedicated RRC signaling when, for example, the UE requests this, such as for high-velocity UEs. Modification of the TA scaling and TA offset can also be performed via dedicated RRC signaling.

The TA offset parameter can be set by the eNB or gNB based on knowledge/expectation on where the served UEs are located. For example, in case of the ship-to-shore scenario, a certain eNB or gNB could be configured to serve only UEs on ships at large distances, such as distances of from 100 to 300 km from the closest eNB or gNB which can serve a UE at an extreme range. In another example, when the eNB or gNB is on board a non-geostationary satellite, the minimum expected radio range is approximately 600 to 1000 km, depending on the satellite orbit, and this is valid for all served terrestrial UEs; therefore, they can be pre-compensated using the TA offset parameter.

The extreme range access procedure also requires that control and shared channels can operate at very high path loss and large delays.

For example, in case the HARQ RTT is 8 ms (HARQ retransmission scheduled at n+8), a TA of 6.7 ms would leave 0.3 ms for processing delay (8 ms (RTT budget)–6.7 ms (TA)–1 ms (actual transmission) for the extreme radius of 1000 km, and therefore may be too stringent, with the exception of the case where one does not allow for HARQ retransmissions. In case of these extreme cell radii, an RTT equal to or greater than 12 ms should be configured for the UE leaving ~5 ms of processing delay. Such additional delay could be either coupled to the overall processing budget, or communicated dynamically as a function of the processing compensation parameter.

Figure 2:
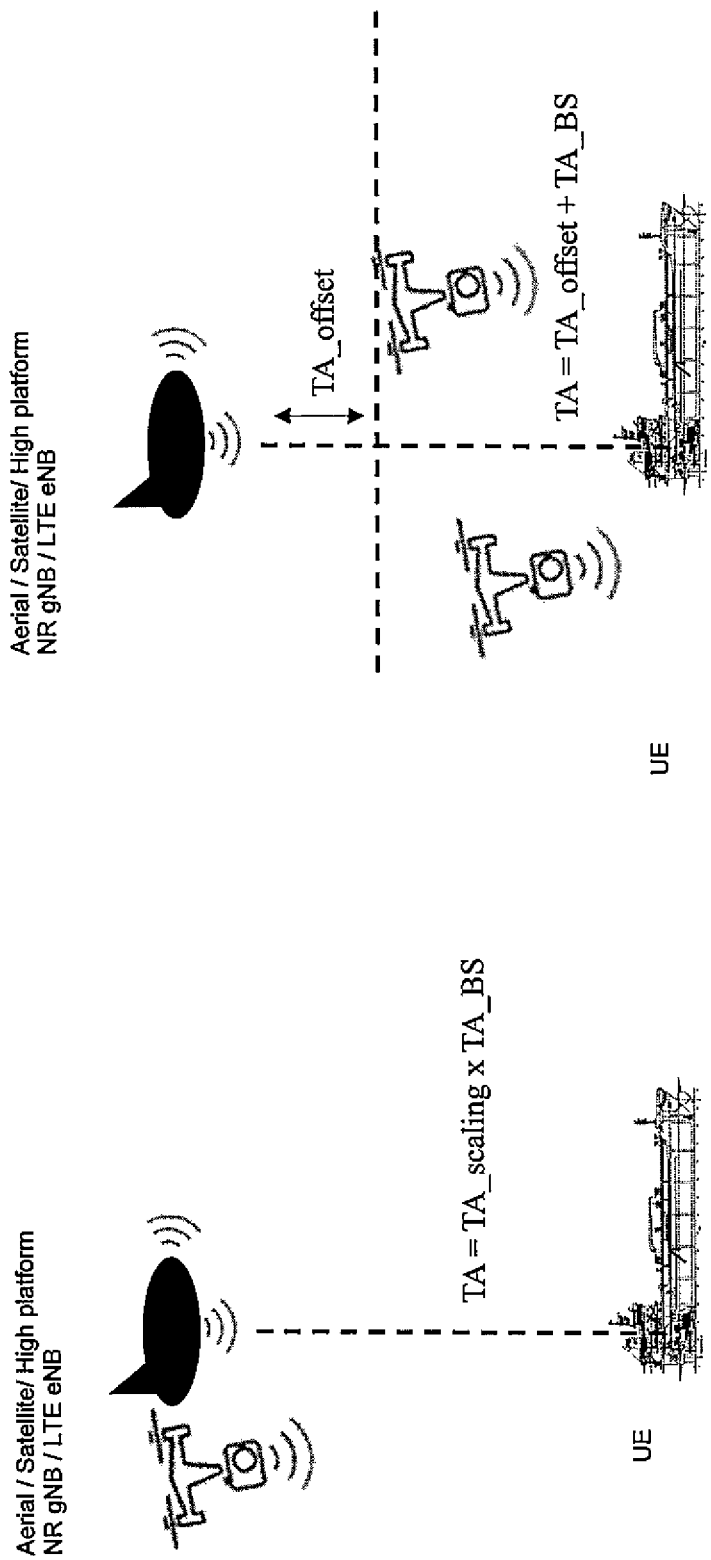
FIG. 2 illustrates the use of a TA scaling parameter on the left and a TA offset parameter on the right.

FIG. 2 illustrates the use of a TA scaling parameter on the left and a TA offset parameter on the right. In FIG. 2, left-hand side, the UE has been configured with a scaling parameter TA_scaling. The configuration may have been provided through one or more of specifications, system broadcast, cell-specific signaling or UE-specific signaling. When receiving an instruction from the base station (eNB or gNB) to set or adjust the timing advance value, the UE will multiply the received value (TA_BS) by the scaling parameter to achieve the actual timing advance value to apply when transmitting data towards the base station.

It should be noted that it is assumed that other user-plane and control-plane channels will be working well even at the extreme cell radius targeted above by means of increased transmission power, such as new UE categories defined, repetitions, and other dedicated means expected to be covered as part of the study about NR to support non-terrestrial networks, see 3GPP TR 38.811, "Study on NR to Support Non-Terrestrial Networks." LTE NB-IoT (narrowband internet of things) and eMTC (enhanced machine type communications) already have standardized mechanisms to mitigate this and keep operational both the control and shared channels, even if at very low data rates.

This disclosure allows the support of random access and TA/uplink synchronization procedures with minimal impact on the standardization. This is achieved based on the current RACH and TA framework, that is, reusing the defined PRACH preamble format/configuration and TA index signaling, by introducing simple scaling and offset of existing values signaled by the eNB or gNB.

In one embodiment of the present disclosure, the eNB or gNB would communicate a trigger/condition for application of the specific additional TA parameters to be applied. This threshold could be implemented as a value indicating a certain maximum reference signal received power (RSRP) or reference signal received quality (RSRQ) level to be observed by the UE which would trigger the UE to apply the configured parameters. As one example, the UE would need to have a maximum RSRP of –100 dBm which would indicate that the UE is far away from the eNB or gNB, and hence the processing compensation values would be applied.

In another embodiment, the UE would apply the parameters for TA scaling in a semi-autonomous way to select the scaling parameters. During the RRC connection request procedure, the UE would indicate that it has used TA offset and/or TA scaling. According to this procedure, the eNB or gNB would be able to keep track of individual UE real TA parameters and ensure that each UE transmission is adjusted accordingly.

Figure 3:
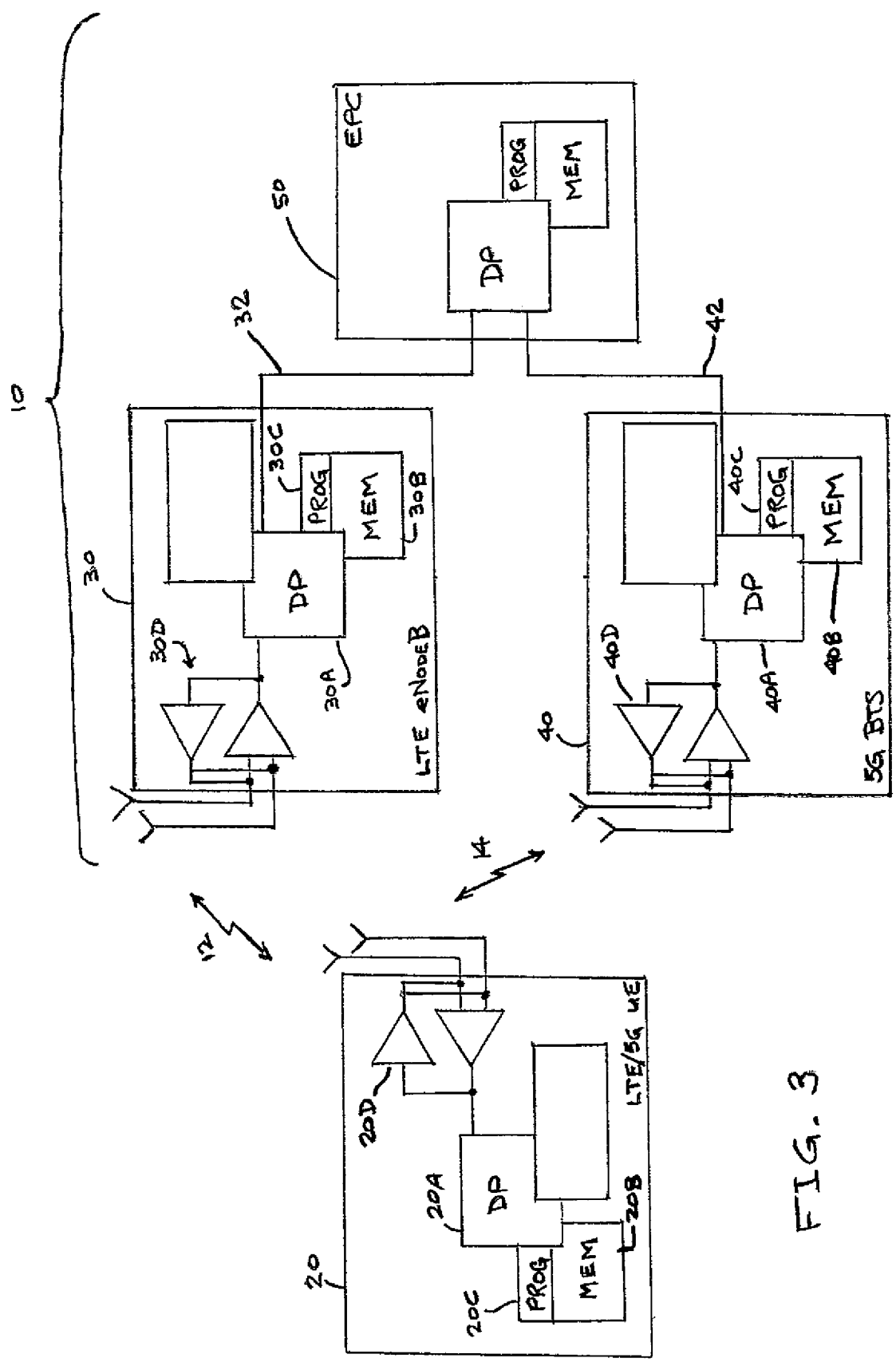
FIG. 3 illustrates a simplified block diagram of various electronic devices and apparatus that are suitable for use in practicing exemplary embodiments of the present disclosure.

Reference is now made to FIG. 3 for illustrating a simplified block diagram of various electronic devices and apparatus that are suitable for use in practicing the exemplary embodiments of the present invention. In FIG. 3, a wireless network 10 is adapted for communication over a wireless link 12 with an apparatus, such as a mobile communication device, which is referred to as an LTE/5G UE 20, via a wireless network access node, such as a base station or relay station or remote radio head, and more specifically shown as an LTE eNodeB 30. Alternatively, LTE/5G UE 20 may communicate over wireless link 14 with a 5G wireless network access node, shown as a 5G BTS 40. The network 10 may include an evolved packet core (EPC) 50, which serves as a mobility management entity (MME).

The LTE/5G UE 20 includes a controller, such as a computer or a data processor (DP) 20A, a computer-readable memory medium embodied as a memory (MEM) 20B, which stores a program of computer instructions (PROG) 20C, and a suitable radio frequency (RF) transmitter and receiver 20D for wireless communications with the LTE eNodeB 30 and the 5G BTS 40 via one or more antennas. The LTE eNodeB 30 also includes a controller, such as a computer or a data processor (DP) 30A, a computer-readable memory medium embodied as a memory (MEM) 30B that stores a program of computer instructions (PROG) 30C, and a suitable RF transmitter and receiver 30D for communication with the LTE/5G UE 20 via one or more antennas. The LTE eNodeB 30 is coupled via a data/control path 32 to the EPC 50. The path 32 may be implemented as an S1 interface.

The 5G BTS 40 also includes a controller, such as a computer or a data processor (DP) 40A, a computer-readable memory medium embodied as a memory (MEM) 40B that stores a program of computer instructions (PROG) 40C, and a suitable RF transmitter and receiver 40D for communication with the LTE/5G UE 20 via one or more antennas. The 5G BTS 40 may also be coupled via a data/control path 42 to the EPC 50. The path 42 may also be implemented as an S1 interface.

At least one of the PROGs 20C, 30C, and 40C is assumed to include program instructions that, when executed by the associated DP, enable the respective device 20, 30, 40 to operate in accordance with the exemplary embodiments of this invention as was detailed above. That is, the exemplary embodiments of this invention may be implemented at least in part by computer software executable by the DP 20A of the LTE/5G UE 20, by the DP 30A of the LTE eNodeB 30, and/or by the DP 40A of the 5G BTS 40, or by hardware, or by a combination of software and hardware (and firmware).

In general, the various embodiments of the LTE/5G UE 20 can include, but are not limited to, cellular telephones; personal digital assistants (PDAs) having wireless communication capabilities; portable computers having wireless communication capabilities; image capture devices, such as digital cameras, having wireless communication capabilities; gaming devices having wireless communication capabilities; music storage and playback appliances having wireless communication capabilities; and Internet appliances permitting wireless Internet access and browsing, as well as portable units or terminals that incorporate combinations of such functions.

The computer-readable MEMs 20B, 30B, and 40B may be of any type suitable to the local technical environment and may be implemented using any suitable data storage technology, such as semiconductor-based memory devices, flash memory, magnetic-memory devices and systems, optical-memory devices and systems, fixed memory and removable memory. The DPs 20A, 30A, and 40A may be of any type suitable to the local technical environment, and may include one or more of general purpose computers, special purpose computers, microprocessors, digital signal processors (DSPs) and processors based on a multicore processor architecture, as non-limiting examples.

It should be noted that the various DPs 20A, 30A, and 40A may be implemented as one or more processors/chips, any one or all of the LTE/5G UE 20, the LTE eNodeB 30, and the 5G BTS 40 may include more than one transmitter and/or receiver 20D, 30D, and 40D, and particularly the LTE eNodeB 30 and the 5G BTS 40 may have their antennas mounted remotely from their other components, such as for example tower-mounted antennas.

Figure 4:
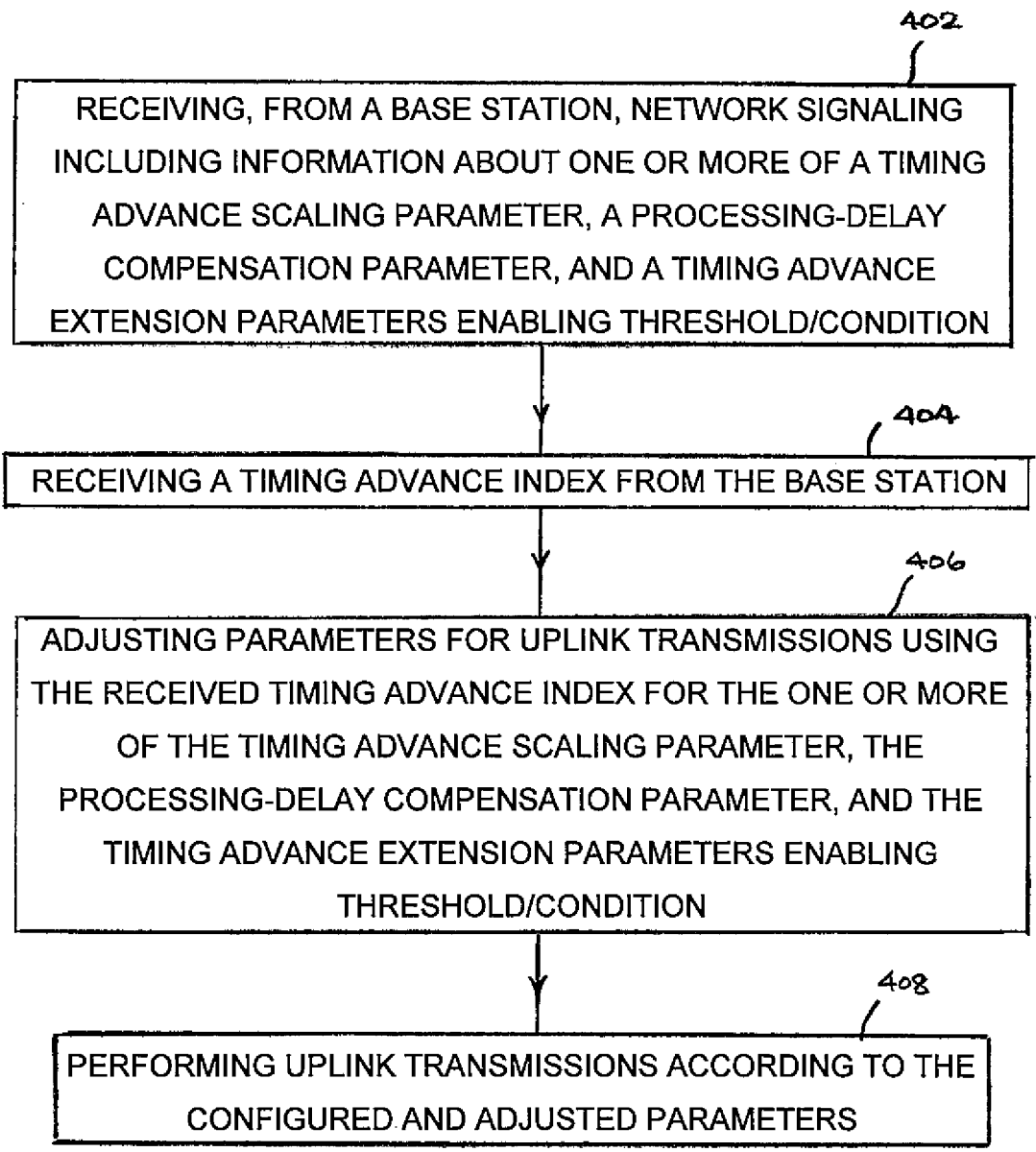
FIG. 4 is a flow chart illustrating a method performed by a user equipment in accordance with the present disclosure.

FIG. 4 is a flow chart illustrating a method performed by a user equipment in accordance with the present disclosure. In block 402, the user equipment receives, from a base station, network signaling including information about one or more of a timing advance scaling parameter, a processing-delay compensation parameter, and a timing advance extension parameters enabling threshold/condition. In block 404, the user equipment receives a timing advance index from the base station. In block 406, the user equipment adjusts parameters for uplink transmissions using the received timing advance index for the one or more of the timing advance scaling parameter, the processing-delay compensation parameter, and the timing advance extension parameters enabling threshold/condition. In block 408, the user equipment performs uplink transmissions according to the configured and adjusted parameters.

Figure 5:
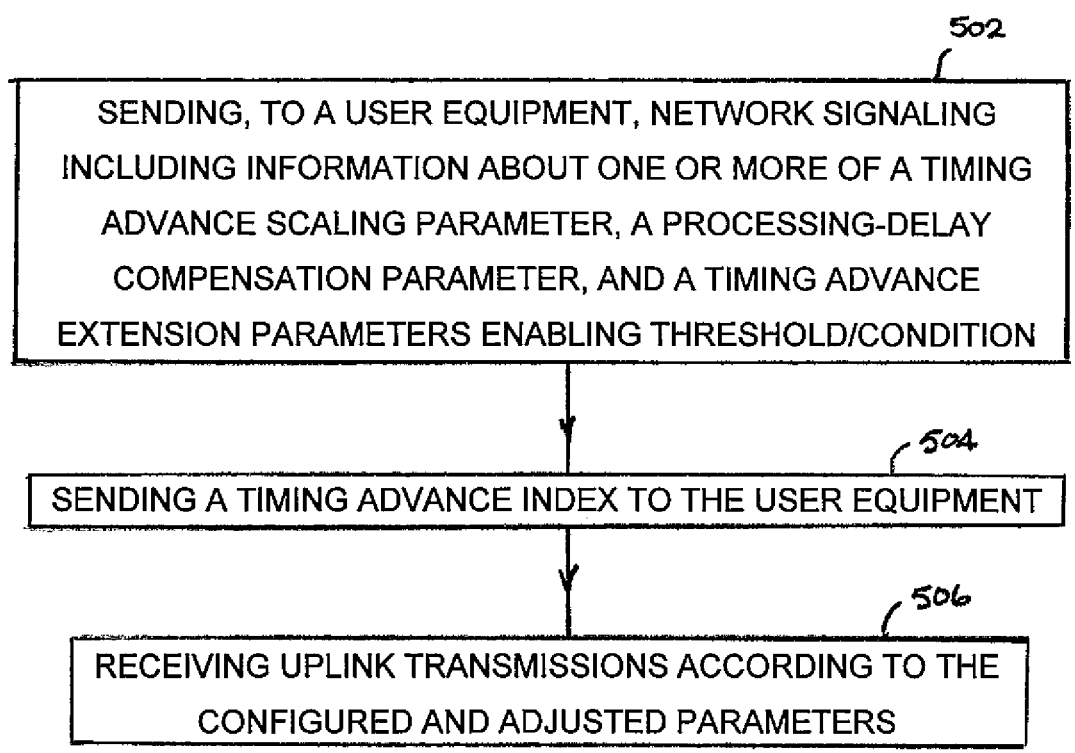
FIG. 5 is a flow chart illustrating a method performed by a base station in accordance with the present disclosure.

FIG. 5 is a flow chart illustrating a method performed by a base station in accordance with the present disclosure. In block 502, the base station sends, to a user equipment, network signaling including information about one or more of a timing advance scaling parameter, a processing-delay compensation parameter, and a timing advance extension parameters enabling threshold/condition. In block 504, the base station sends a timing advance index to the user equipment. In block 506, the base station receives uplink transmissions according to the configured and adjusted parameters.

In general, the various exemplary embodiments may be implemented in hardware or special purpose circuits, software, logic or any combination thereof. For example, some aspects may be implemented in hardware, while other aspects may be implemented in firmware or software, which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components, such as integrated circuit chips and modules, and that the exemplary embodiments of this invention may be realized in an apparatus that is embodied as an integrated circuit. The integrated circuit, or circuits, may comprise circuitry, as well as possibly firmware, for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. For example, while the exemplary embodiments have been described above in the context of advancements to the 5G system in view of dual connectivity with LTE, it should be appreciated that the exemplary embodiments of this invention are not limited for use with only these particular types of wireless communication system. For example, the embodiments may be applied to dual connectivity of different radio access technologies. The exemplary embodiments of the invention presented herein are explanatory and not exhaustive or otherwise limiting of the scope of the invention.

The following abbreviations have been used in the preceding discussion:
5G 5$^{th}$ Generation
ACK Acknowledgement
ARQ Automatic Repeat Request
BLER Block Error Ratio
CB Code Block
CP Cyclic Prefix
dBm Decibel-Milliwatts
DL Downlink
GT Guard Time
eMBB enhanced Mobile Broadband
eMTC enhanced Machine Type Communications
HARQ Hybrid ARQ
IFFT Inverse Fast Fourier Transform
ISI Inter-Symbol Interference
LCG Logical Channel Group
LCH Logical Channel
LTE Long Term Evolution
NB-IoT Narrow Band Internet of Things
NR New Radio
OFDM Orthogonal Frequency Division Multiplexing
PCI Physical Cell Identifier
PDU Protocol Data Unit
PRACH Physical Random Access Channel
PSS Primary Synchronization Signal
RA Resource Allocation
RACH Random Access Channel
RAR Random Access Response
RNTI Radio Network Temporary Identifier
RRS Radio Resource Control
RSRP Received Signal Received Power
RSRQ Received Signal Received Quality
RTT Round Trip Time
SIB System Information Block
SSS Secondary Synchronization Signal
TA Timing Advance
TB Transport Block
TTI Transmission Time Interval
UE User Equipment
UL Uplink
UpPTS Uplink Pilot Time Slot The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The various embodiments were chosen and described in order to best explain the principles of the invention and the practical application, and to enable others of ordinary skill in the art to understand the invention for various embodiments with various modifications as are suited to the particular use contemplated.

Various modifications and adaptations may become apparent to those skilled in the relevant arts in view of the foregoing description, when read in conjunction with the accompanying drawings. However, any and all modifications of the teachings of this disclosure will still fall within the scope of the non-limiting embodiments of this invention.

Although described in the context of particular embodiments, it will be apparent to those skilled in the art that a number of modifications and various changes to these teachings may occur. Thus, while the invention has been particularly shown and described with respect to one or more embodiments thereof, it will be understood by those skilled in the art that certain modifications or changes may be made therein without departing from the scope of the invention as set forth above, or from the scope of the claims to follow.

What is claimed is:

1. A method comprising:
receiving, by a user equipment from a base station, network signaling including information about one or more of a timing advance offset parameter, a timing advance scaling parameter, a processing-delay compensation parameter, and a timing advance extension parameters enabling threshold/condition;
receiving a timing advance index from the base station, the timing advance index being a multiplicative factor by which a largest timing advance value available under a physical random access channel (PRACH) format is multiplied when a distance from the base station to the user equipment is larger than a distance corresponding to the largest timing advance value;
adjusting parameters for uplink transmissions using the received timing advance index for the one or more of the timing advance offset parameter, the timing advance scaling parameter, the processing-delay compensation parameter, and the timing advance extension parameters enabling threshold/condition; and
performing uplink transmissions according to the adjusted parameters.

2. The method as claimed in claim 1, wherein the uplink transmission is a random access message 3 or a transmission on an uplink shared channel.

3. The method as claimed in claim 1, further comprising:
performing a random access channel procedure including sending a preamble sequence to the base station, and receiving a random access response from the base station, said random access response including the timing advance index.

4. The method as claimed in claim 1, further comprising:
adjusting operation with respect to hybrid automatic repeat request acknowledgment timing reporting procedures to match the processing-delay compensation parameter.

5. The method as claimed in claim 1, wherein the adjusting of parameters comprises adjusting a processing delay for generating the uplink transmission.

6. The method as claimed in claim 1, wherein, when network signaling includes information about the timing advance scaling parameter, a multiplicative scaling factor is applied to the timing advance index.

7. The method as claimed in claim 1, wherein, when network signaling includes information about the processing-delay compensation parameter, the processing-delay compensation parameter is applied to relax timing-related delays.

8. The method as claimed in claim 1, wherein, when network signaling includes information about the timing advance extension parameters enabling threshold/condition, the timing advance extension parameters enabling threshold/condition is based on user equipment received power levels or physical cell identifier information related to user equipment location.

9. An apparatus comprising:
at least one processor; and
at least one memory including computer-program code, the at least one memory and the computer-program code configured, with the at least one processor, to cause the apparatus to perform:
receiving, by the apparatus from a base station, network signaling including information about one or more of a timing advance offset parameter, a timing advance scaling parameter, a processing-delay compensation parameter, and a timing advance extension parameters enabling threshold/condition;
receiving a timing advance index from the base station, the timing advance index being a multiplicative factor by which a largest timing advance value available under a physical random access channel (PRACH) format is multiplied when a distance from the base station to the apparatus is larger than a distance corresponding to the largest timing advance value;
adjusting parameters for uplink transmissions using the received timing advance index for the one or more of the timing advance offset parameter, the timing advance scaling parameter, the processing-delay compensation parameter, and the timing advance extension parameters enabling threshold/condition; and
performing uplink transmissions according to the adjusted parameters.

10. The apparatus as claimed in claim 9, wherein the uplink transmission is a random access message 3 or a transmission on an uplink shared channel.

11. The apparatus as claimed in claim 9, wherein the at least one memory and the computer-program code are further configured, with the at least one processor, to cause the apparatus to perform:
performing a random access channel procedure including sending a preamble sequence to the base station, and receiving a random access response from the base station, said random access response including the timing advance index.

12. The apparatus as claimed in claim 9, wherein the at least one memory and the computer-program code are further configured, with the at least one processor, to cause the apparatus to perform:
adjusting operation with respect to hybrid automatic repeat request acknowledgment timing reporting procedures to match the processing-delay compensation parameter.

13. The apparatus as claimed in claim 9, wherein the adjusting of parameters comprises adjusting a processing delay for generating the uplink transmission.

14. The apparatus as claimed in claim 9, wherein network signaling is in the form of system information blocks.

15. The apparatus as claimed in claim 9, wherein, when network signaling includes information about the timing advance scaling parameter, a multiplicative scaling factor is applied to the timing advance index.

16. The apparatus as claimed in claim 9, wherein, when network signaling includes information about the processing-delay compensation parameter, the processing-delay compensation parameter is applied to relax timing-related delays.

17. The apparatus as claimed in claim 16, wherein the timing-related delays are hybrid automatic repeat request acknowledgment feedback timing requirements.

18. The apparatus as claimed in claim 9, wherein the timing advance index corresponds to the scaled timing advance index based on the timing advance scaling parameter.

19. The apparatus as claimed in claim 9, wherein, when network signaling includes information about the timing advance extension parameters enabling threshold/condition, the timing advance extension parameters enabling threshold/condition is based on user equipment received power levels or physical cell identifier information related to user equipment location.

20. A computer program product comprising a non-transitory computer-readable storage medium bearing computer program code embodied therein for use with a computer, the computer program code comprising code for performing:
receiving, by a user equipment from a base station, network signaling including information about one or more of a timing advance offset parameter, a timing advance scaling parameter, a processing-delay compensation parameter, and a timing advance extension parameters enabling threshold/condition;
receiving a timing advance index from the base station, the timing advance index being a multiplicative factor by which a largest timing advance value available under a physical random access channel (PRACH) format is multiplied when a distance from the base station to the user equipment is larger than a distance corresponding to the largest timing advance value;
adjusting parameters for uplink transmissions using the received timing advance index for the one or more of the timing advance offset parameter, the timing advance scaling parameter, the processing-delay compensation parameter, and the timing advance extension parameters enabling threshold/condition; and
performing uplink transmissions according to the adjusted parameters.

* * * * *